United States Patent
Fujioka et al.

(10) Patent No.: US 7,454,966 B2
(45) Date of Patent: Nov. 25, 2008

(54) TIRE INFORMATION COMMUNICATION DEVICE

(75) Inventors: Eiji Fujioka, Kariya (JP); Manabu Kato, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 22 days.

(21) Appl. No.: 10/594,232

(22) PCT Filed: Mar. 4, 2005

(86) PCT No.: PCT/JP2005/003784

§ 371 (c)(1),
(2), (4) Date: Sep. 25, 2006

(87) PCT Pub. No.: WO2005/092642

PCT Pub. Date: Oct. 6, 2005

(65) Prior Publication Data

US 2007/0186635 A1    Aug. 16, 2007

(30) Foreign Application Priority Data

Mar. 26, 2004    (JP) .............................. 2004-093421

(51) Int. Cl.
*B60C 23/02* (2006.01)
(52) U.S. Cl. ..................................................... 73/146.5
(58) Field of Classification Search ......... 73/146–146.8
See application file for complete search history.

(56) References Cited

FOREIGN PATENT DOCUMENTS

| JP | 6-219113 A | 8/1994 |
|---|---|---|
| JP | 10019710 A | 1/1998 |
| JP | 10309914 A | 11/1998 |
| JP | 2003006779 A | 1/2003 |
| JP | 2003-283537 | 10/2003 |
| JP | 2004244851 A | 9/2004 |
| JP | 2005055319 A | 3/2005 |
| JP | 2005138605 A | 6/2005 |

OTHER PUBLICATIONS

Japanese Office Action dated Aug. 7, 2007.

*Primary Examiner*—Andre J Allen
(74) *Attorney, Agent, or Firm*—Sughrue Mion, PLLC

(57) ABSTRACT

A receiving antenna RA of a receiving unit RU is positioned at an inner diameter side of a rotation locus of a transmitting unit TU when a tire T rotates. Consequently, it shortens a reaching distance of electromagnetic waves and lessens its change, thereby making it easy to keep a stable receiving sensitivity state. Moreover, the receiving antenna RA is made of a wire of a predetermined length that is made integral inside a wire harness WH connected to the receiving unit RU. Consequently, it becomes easy to make the receiving antenna RA in a length of $\lambda/4$ of a wavelength $\lambda$ of the electromagnetic waves in use, a length of an integral multiple thereof, or $5/8\lambda$. As a result, the receiving sensitivity can be improved.

2 Claims, 8 Drawing Sheets

DS Drive shaft

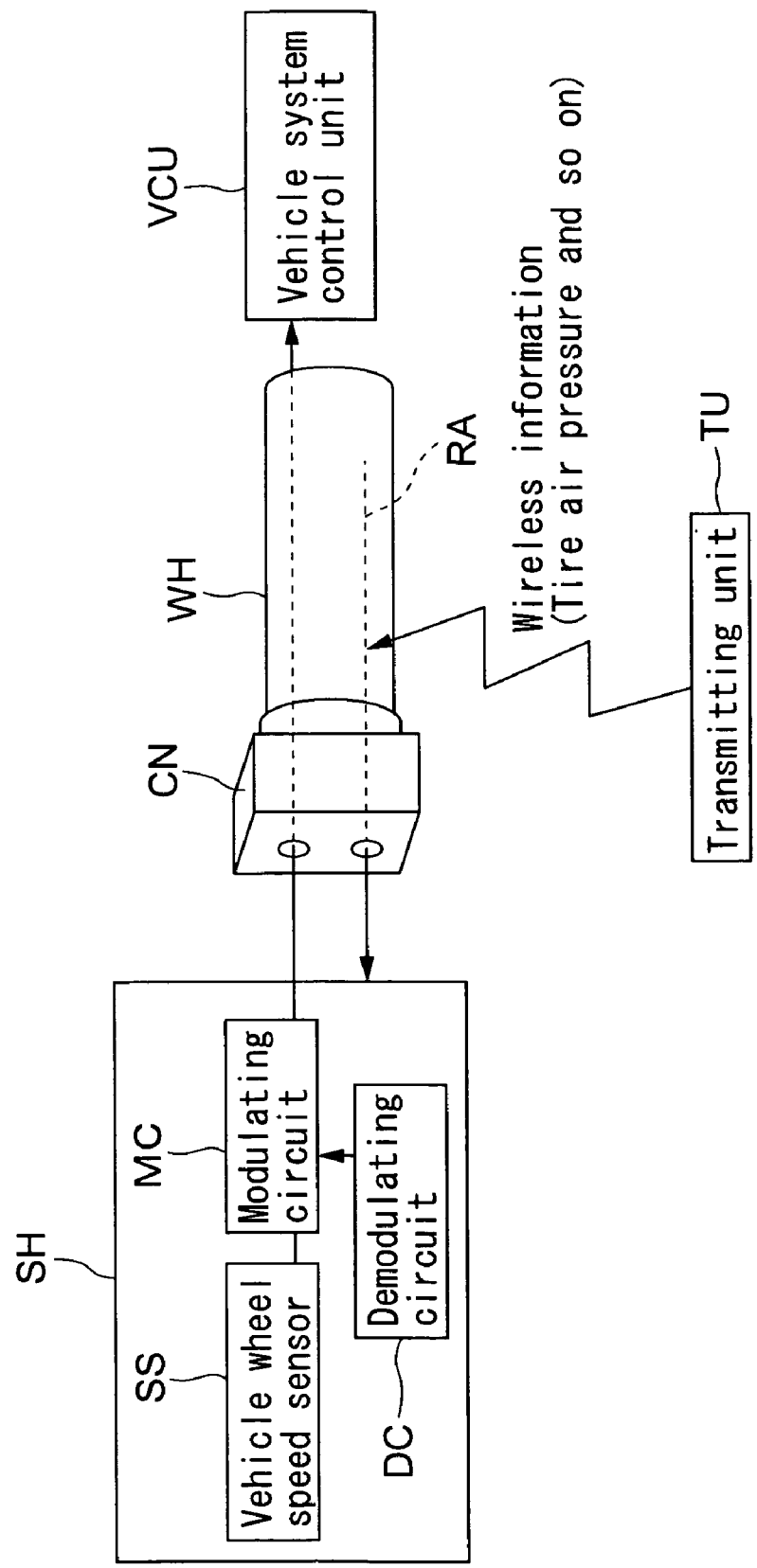

TIRE INFORMATION COMMUNICATION DEVICE

This is a National Stage entry of International Application PCT/JP2005/003784, with an international filing date of Mar. 4, 2005, and the complete disclosure of which is incorporated into this application by reference.

TECHNICAL FIELD

The present invention relates to a tire information communication device. Particularly, this invention pertains to a tire information communication device that has a receiving unit disposed at a vehicle body side for contactlessly receiving a signal outputted from a transmitting unit disposed at a vehicle wheel side so that it can receive the signal stably and accurately.

BACKGROUND ART

In communication systems such as automobile tire information communication devices that use weak radio waves, a mounting position and a mounting method of a receiving antenna and a radio signal demodulating circuit are devised in order to maintain a good receiving sensitivity at low costs. In a patent publication No. 1, there is described an invention that makes a receiving antenna, a radio signal demodulating circuit and a vehicle wheel speed sensor into an integral structure in a tire information communication device, thereby realizing a good receiving sensitivity at low costs.

That is, according to the patent publication No. 1, the vehicle wheel speed sensor is installed near a rotation center of a tire. Then, the receiving antenna and the vehicle wheel speed sensor are made into the integral structure. Thus, even if a transmitting unit is rotated by a rotation of the tire, the sensor can get a stable receiving sensitivity by keeping generally a constant distance to the transmitting unit.

Moreover, while the radio signal demodulating circuit is provided at a vehicle body side, it is provided inside a housing of the vehicle wheel speed sensor. Accordingly, it is possible to eliminate a coaxial cable connecting the demodulating circuit and the receiving antenna, thereby reducing costs by that much. Furthermore, there is no need if extra parts for mounting the receiving antenna and the radio signal demodulating circuit Patent Application Ser. No. 1: Pat. Appln. 2003-283537

DISCLOSURE OF THE INVENTION

Problems That the Invention is to Solve

There are many parts around a rotation axis of a tire/wheel, on which the vehicle wheel speed sensor is mounted, such as a brake system, a suspension system, wirings for sensors or actuators or the like for controlling these systems, brake hoses and so on. Therefore, it is necessary to lessen a size of the wheel sensor installed thereat from interference problem.

However, the invention of the publication No. 1 has a structure in which the receiving antenna and the demodulating circuit are built in the housing of the vehicle wheel speed sensor. Therefore, a size of the housing becomes large in comparison with conventional vehicle wheel speed sensors having no such parts built in. Consequently, the invention has disadvantages that it interferes with surrounding parts in its mechanical arrangement. Moreover, there are many metal structural objects such as a suspension arm, a brake caliper and so on around a location where the vehicle wheel speed sensor is arranged. Accordingly, in case of the structure that builds in the receiving antenna in the housing of the vehicle wheel speed sensor, attenuation of radio waves coming to the antenna becomes large due to radio disturbance by absorption, reflection or the like in wireless communication. Consequently, there is possibility that a required receiving sensitivity is not obtained. Coping with this, an antenna of a high sensitivity is used to enable it to obtain the required receiving sensitivity even if the attenuation of the arriving radio waves is large. Still, the antenna must be enlarged in order to get the receiving antenna with high sensitivity. Then, the housing becomes large accordingly and interferes with the surrounding parts in its mechanical arrangement. As a result, it becomes a factor of cost escalation.

Then, in order to solve the above problems, it is an object of the present invention to provide a tire information communication device that is able to make an antenna high sensitive for a long time without interference with surrounding parts in a mechanical arrangement.

Means to Solve the Problem

A tire information communication device according to claim 1 comprises a transmitting unit detecting a state information of a tire of a vehicle and outputting its detection signal to an outside as electromagnetic waves; and a receiving unit receiving the state information of the tire from the transmitting unit as the electromagnetic waves near an end portion of an axle of the vehicle or inside a tire house; wherein an antenna of the receiving unit is composed of a wire of a predetermined length positioned inside a cylindrical space having a rotation locus of the transmitting unit as an outer diameter thereof and having the axle as a center axis when the tire rotates, the wire being made integral with a wire harness that is connected to the receiving unit. The aforementioned tire state information means a pressure or a temperature inside the tire. It is a state information that can detect a tire blowout from an abnormal high pressure, low pressure or high temperature. Moreover, the aforementioned transmitting unit detects the tire state information of the vehicle and outputs the detection signal to the outside as the electromagnetic waves. However, in practicing the present invention, any modification is possible as long as it outputs the detection signal to the outside as the electromagnetic waves, while sensing at least a temperature, an acceleration, its power supply voltage or the like if required. Furthermore, a position at an inner diameter side of the rotation locus of the aforementioned transmitting unit may be modified as long as the transmitting unit is within a range of a diameter of a locus of a freely-rotating wheel. In addition, the wire of the predetermined length that is made integral with the wire harness connected to the aforementioned receiving unit may be one or more linear or coiled wires constituting the wire harness, a coiled wire bundling other wires of the wire harness, a knitted and braided wire of a cylindrical shape bundling other wires of the wire harness or the like.

A tire information communication device according to claim 2 comprises a transmitting unit detecting a state information of a tire of a vehicle and outputting its detection signal to an outside as electromagnetic waves; and a receiving unit receiving the state information of the tire from the transmitting unit as the electromagnetic waves near an end portion of an axle of the vehicle while being housed in or disposed together with a housing of a vehicle wheel speed sensor; wherein an antenna of the receiving unit is composed of a wire of a predetermined length positioned inside a cylindrical space having a rotation locus of the transmitting unit as an outer diameter thereof and having the axle as a center axis when the tire rotates, the wire being made integral with a wire harness that is connected to the receiving unit, an output of the state information of the tire being overlapped with an output of the vehicle wheel speed sensor so that both the outputs are outputted by a common line. The aforementioned transmitting unit, the position at the inner diameter side of the rotation locus of the aforementioned transmitting unit, the wire of the predetermined length that is made integral with the wire harness connected to the aforementioned receiving unit are not different from the concepts of the aforementioned claim 1. Moreover, the housing of the vehicle wheel speed sensor that houses the aforementioned receiving unit may be constituted as a special housing for the both members. Alternatively, the housing of the wheel may be used. In overlapping the state information output of the tire with the output of the aforementioned vehicle wheel speed sensor so as to output both the outputs by the common line, the output of the vehicle wheel speed sensor has a relatively low frequency or a frequency less than a dozen KHz. Then, if a frequency of several MHz is overlapped therewith, a signal separation is easily enabled only by a filter. Accordingly, any modification is possible as long as both the outputs are overlapped with each other while having different signal modes.

A tire information communication device according to claim 3 comprises a transmitting unit detecting a state information of a tire of a vehicle and outputting its detection signal to an outside as electromagnetic waves; and a receiving unit receiving the state information of the tire from the transmitting unit as the electromagnetic waves near an end portion of an axle of the vehicle while being housed in or disposed together with a housing of a vehicle wheel speed sensor; wherein an antenna of the receiving unit is composed of a wire of a predetermined length positioned inside a cylindrical space having a rotation locus of the transmitting unit as an outer diameter thereof and having the axle as a center axis when the tire rotates, the wire being made integral with a wire harness that is connected to the receiving unit, an output of the vehicle wheel speed sensor and an output of the state information of the tire being modulated so that both the outputs are outputted by a common line. The aforementioned transmitting unit, the position at the inner diameter side of the rotation locus of the aforementioned transmitting unit, the wire of the predetermined length that is made integral with the wire harness connected to the aforementioned receiving unit are not different from the concepts of the aforementioned claim 1. Moreover, the housing of the vehicle wheel speed sensor that houses the aforementioned receiving unit may be constituted as a special housing for the both members. Alternatively, the housing of the wheel may be used. Both the outputs can be outputted through the common line by using a pulse train of the output from the aforementioned vehicle wheel speed sensor as carrier waves or a carrier, while quantizing an information containing at least an inside pressure of the tire and modulating it by PAM, PWM or the like.

In a tire information communication device according to claim 4, the antenna of the aforementioned receiving unit recited in one of claim 1 to claim 3 is disposed such that a side thereof connected to the aforementioned receiving unit is generally in parallel with a rotation axis of the tire. Parallel disposition of the antenna of the aforementioned receiving unit to the rotation axis of the tire may be modified as long as a component thereof in a direction parallel to the rotation axis of the tire can be positively enlarged.

In a tire information communication device according to claim 5, the antenna of the aforementioned receiving unit recited in one of claim 1 to claim 4 is wound in a coil shape so as to be set in a predetermined length. The antenna of the aforementioned receiving unit may be wound in the coil shape inside the wire harness or may be formed such that it winds a whole lead wire therein.

In a tire information communication device according to claim 6, the antenna of the aforementioned receiving unit recited in one of claim 1 to claim 4 is knitted in a knitted and braided shape so as to be set in a predetermined length. The antenna of the receiving unit knitted in the aforementioned knitted and braided shape so as to be set in the predetermined length may be arranged in the coil shape inside the wire harness or may be formed such that it wraps a whole lead wire therein.

In a tire information communication device according to claim 7, the antenna in the coil shape of the aforementioned receiving unit recited in claim 5 is wound so as to wind the aforesaid wire harness therein. The antenna in the coil shape of the aforementioned receiving unit may be modified as long as it is capable of being bent or curved.

In a tire information communication device according to claim 8, the antenna in the knitted and braided shape of the aforesaid receiving unit recited in claim 6 is wound so as to wrap the aforesaid wire harness as a whole therein. The antenna in the knitted and braided shape of the aforementioned receiving unit may be modified as long as it is capable of being bent or curved.

In a tire information communication device according to claim 9, the antenna of the aforesaid receiving unit recited in one of claim 1 to claim 8 is made into a length ¼ that of a wavelength λ of the aforesaid received electromagnetic waves.

In a tire information communication device according to claim 10, the antenna of the aforesaid receiving unit recited in one of claim 1 to claim 8 is made into a length of an integral multiple of a wavelength λ of the aforesaid received electromagnetic waves.

In a tire information communication device according to claim 11, the antenna of the aforesaid receiving unit recited in one of claim 1 to claim 8 is made into a length ⅝ that of a wavelength λ of the aforesaid received electromagnetic waves.

In a tire information communication device according to claim 12, the aforesaid receiving unit recited in one of claim 1 to claim 11 detects an air pressure of the tire of the vehicle by a pressure sensor and outputs a detection signal thereof as electromagnetic waves. A frequency of 315 MHz, 433 MHz, 868 MHz or the like is used as the aforementioned electromagnetic waves, for example. However, in practicing the invention, it is not limited to the aforementioned frequency band and may be any frequency as long as it is a frequency permitted as a frequency for a vehicle use.

EFFECTS OF THE INVENTION

In the tire information communication device according to claim 1, the transmitting unit detects the state information of the tire of the vehicle and outputs the detection signal to the outside as the electromagnetic waves. The receiving unit receives the state information of the tire from the transmitting unit as the electromagnetic waves near the end portion of the axle of the vehicle. At this time, the antenna of the receiving unit is positioned inside the cylindrical space having the rotation locus of the transmitting unit as the outer diameter thereof and having the axle as the center axis when the tire rotates, it lessens a change of a reaching distance of the electromagnetic waves and makes it easy to keep a receiving sensitivity state stable. Moreover, the antenna is composed of the wire of the predetermined length that is made integral inside the wire harness connected to the receiving unit. Therefore, it becomes easy to adjust the antenna of the receiving unit in a length favorable for reception such as λ/4 of a wavelength of the used electromagnetic waves, a length of an integral multiple thereof, ⅝λ or the like. Furthermore, a distance in sending and receiving the electromagnetic waves is short and the reception can be performed at a position where an electric field intensity is high. Consequently, it is possible to lower a probability of noise entrance. As a result, it can be used in a condition where a S/N ratio becomes high. In addition, the wire of the predetermined length inside the wire harness constitutes the antenna. Accordingly, a housing of the receiving unit can be structured in a compact manner. Moreover, it is possible to prevent a mechanical interference in arranging surrounding parts.

In the tire information communication device according to claim 2, the transmitting unit detects the state information of the tire of the vehicle and outputs the detection signal to the outside as the electromagnetic waves. The receiving unit housed in the housing of the vehicle wheel speed sensor receives the state information of the tire from the transmitting unit as the electromagnetic waves near the end portion of the axle of the vehicle. At this time, the antenna of the receiving unit is positioned inside the cylindrical space having the rotation locus of the transmitting unit as the outer diameter thereof and having the axle as the center axis when the tire rotates, it lessens a change of a reaching distance of the electromagnetic waves and makes it easy to keep a receiving sensitivity state. That is, a distance in sending and receiving the electromagnetic waves is short and the reception can be performed at a position where its variation is less and an electric field intensity is high and stable. Consequently, it is possible to lower a probability of noise entrance. Moreover, it can be used in a condition where a S/N ratio becomes high. In addition, the antenna is composed of the wire of the predetermined length that is made integral inside the wire harness connected to the receiving unit. Therefore, it becomes easy to make the antenna of the receiving unit in a length of λ/4 of a wavelength λ of the electromagnetic waves in use, a length of an integral multiple thereof, or ⅝λ. Furthermore, the wire of the predetermined length inside the wire harness constitutes the antenna. Accordingly, the housing of the vehicle wheel speed sensor housing the receiving unit can be structured without getting bigger. Moreover, it is possible to prevent a mechanical interference in arranging surrounding parts, too. In addition, the output of the state information of the tire is overlapped with the output of the vehicle wheel speed sensor so that both the outputs are outputted by the common line. Accordingly, it is possible to reduce costs by that much. Moreover, a conventional wiring can be used for the vehicle wheel speed sensor, thereby making the costs low.

In the tire information communication device according to claim 3, the transmitting unit detects the state information of the tire of the vehicle and outputs the detection signal to the outside as the electromagnetic waves. The receiving unit housed in the housing of the vehicle wheel speed sensor receives the state information of the tire from the transmitting unit as the electromagnetic waves near the end portion of the axle of the vehicle. At this time, the antenna of the receiving unit is positioned inside the cylindrical space having the rotation locus of the transmitting unit as the outer diameter thereof and having the axle as the center axis when the tire rotates, it lessens a change of a reaching distance of the electromagnetic waves and makes it easy to keep a receiving sensitivity state. That is, a distance in sending and receiving the electromagnetic waves is short and the reception can be performed at a position where an electric field intensity is high. Consequently, it is possible to lower a probability of noise entrance. Moreover, it can be used in a condition where a S/N ratio becomes high. In addition, the antenna is composed of the wire of the predetermined length that is made integral inside the wire harness connected to the receiving unit. Therefore, it becomes easy to make the antenna of the receiving unit in a length of λ/4 of a wavelength λ of the used electromagnetic waves, a length of an integral multiple thereof, or ⅝λ. Furthermore, the wire of the predetermined length inside the wire harness constitutes the antenna. Accordingly, the housing of the vehicle wheel speed sensor housing the receiving unit can be structured without getting bigger. Moreover, it is possible to prevent a mechanical interference in arranging surrounding parts, too. In addition, the output of the state information of the tire is modulated and carried on the output of the vehicle wheel speed sensor so that both the outputs are outputted by the common line. Accordingly, a conventional wiring can be used for the vehicle wheel speed sensor, thereby making the costs low.

In the tire information communication device according to claim 4, the antenna of the receiving unit recited in one of claim 1 to claim 3 is disposed such that the side thereof connected to the aforementioned receiving unit is in parallel with the rotation axis of the tire. Therefore, in addition to the advantages recited in one of claim 1 to claim 4, a polarized wave plane and directivity of the antenna are kept essentially constant relative to a rotation of the transmitting unit. Consequently, it is possible to stably obtain a high receiving sensitivity.

In the tire information communication device according to claim 5, the antenna of the receiving unit recited in one of claim 1 to claim 4 is wound in the coil shape so as to be set in the predetermined length. Therefore, in addition to the advantages recited in one of claim 1 to claim 4, it is possible to obtain a relatively large antenna length as desired.

In the tire information communication device according to claim 6, the antenna of the receiving unit recited in one of claim 1 to claim 4 is knitted in a knitted and braided shape so as to be set in a predetermined length. Therefore, in addition to the advantages recited in one of claim 1 to claim 4, it is possible to obtain a relatively large antenna length as desired.

In the tire information communication device according to claim 7, the antenna of the receiving unit recited in claim 5 is wound so as to wind the aforesaid wire harness therein. Therefore, even if the frequency of the electromagnetic waves received at the receiving antenna is low, no noises are induced on the other wires.

In the tire information communication device according to claim 8, the antenna in the knitted and braided shape of the receiving unit recited in claim 6 is wound so as to wrap the aforesaid wire harness as a whole therein. Therefore, in addition to the advantages recited in claim 6, it is possible to obtain a desired antenna length. Moreover, even if the frequency of the electromagnetic waves received at the receiving antenna is low or a high frequency is overlapped, no noises are induced on the other wires.

In the tire information communication device according to claim 9, the aforesaid antenna recited in one of claim 1 to claim 8 is made into a length ¼ that of a wavelength λ of the aforesaid received electromagnetic waves. Therefore, in addition to the advantages recited in one of claim 1 to claim 8, it is easy to adjust it into a length that is advantageous in receiving.

In the tire information communication device according to claim 10, the aforesaid antenna recited in one of claim 1 to claim 8 is made into a length of an integral multiple of a wavelength λ of the aforesaid received electromagnetic waves. Therefore, in addition to the advantages recited in one of claim 1 to claim 8, it is easy to adjust it into a length that is advantageous in receiving.

In the tire information communication device according to claim 11, the aforesaid antenna recited in one of claim 1 to claim 8 is made into a length ⅝ that of a wavelength λ of the aforesaid received electromagnetic waves. Therefore, in addition to the advantages recited in one of claim 1 to claim 8, it is easy to adjust it into a length that is advantageous in receiving.

In the tire information communication device according to claim 12, the aforesaid receiving unit recited in one of claim 1 to claim 11 detects an air pressure of the tire of the vehicle by a pressure sensor and outputs a detection signal thereof as electromagnetic waves. Therefore, in addition to the advantages recited in one of claim 1 to claim 11, the receiving antenna of the receiving unit is positioned at an inner diameter side of the rotation locus of the transmitting unit when the tire rotates. Consequently, it lessens a change of a reaching distance of the electromagnetic waves and makes it easy to keep a receiving sensitivity state stable.

BRIEF DESCRIPTION OF DRAWINGS

FIG. 10 is an entire configuration diagram showing a schema of a tire information transmission device of a sixth embodiment of the invention.

DESCRIPTION OF CODES

CN: connector
DC: demodulating circuit
DU: detecting unit
DS: drive shaft
MC, MO: modulating circuit
RA: receiving antenna
RU: receiving unit
SS: vehicle wheel speed sensor
T: tire
TA: transmission antenna
TU: transmitting unit
WH: wire harness

BEST MODES TO EMBODY THE INVENTION

Next, an embodiment of the present invention is described referring to drawings.

FIRST EMBODIMENT

Figure 1:
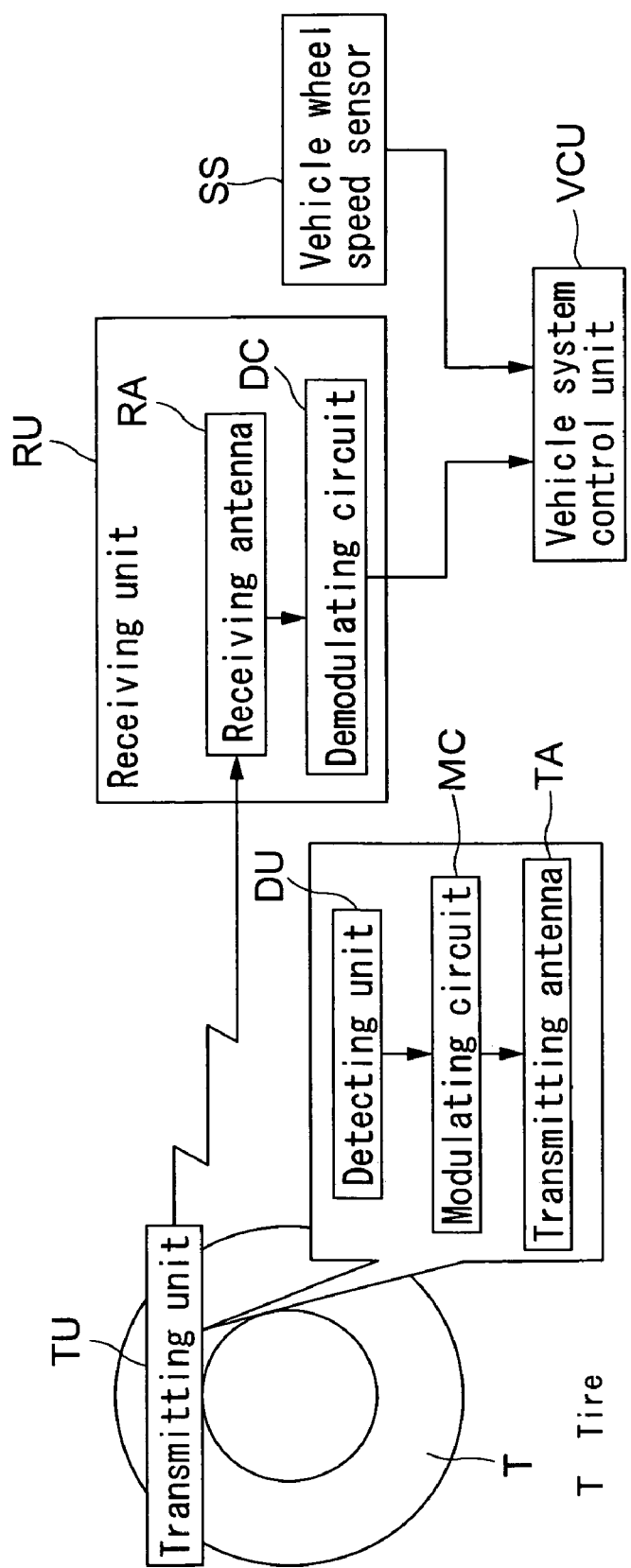
FIG. 1 is a block diagram showing a schema of a tire information transmission device of a first embodiment of the invention.
Figure 2:
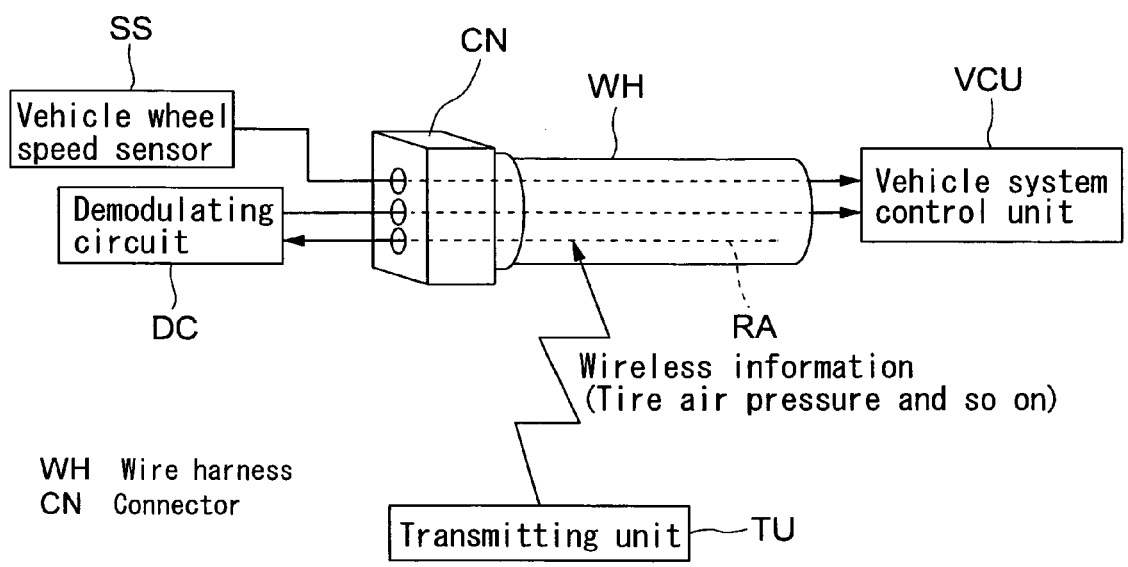
FIG. 2 is an entire configuration diagram showing a schema of the tire information transmission device of the first embodiment of the invention.
Figure 3:
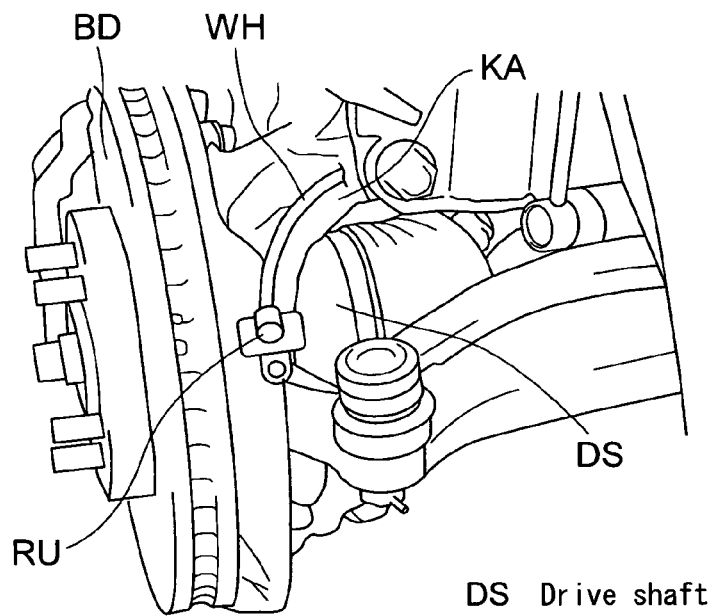
FIG. 3 is a schematic perspective view showing a mounted state of the tire information transmission device on a vehicle in the first embodiment of the invention.
Figure 5:
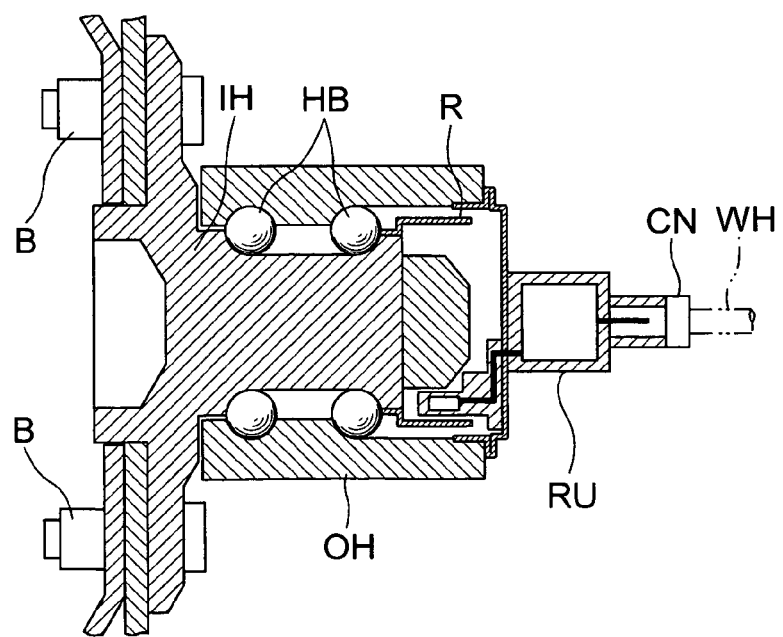
FIG. 5 is a cross-sectional view showing a mounted state of the tire information transmission device on a driven wheel of the vehicle in the first embodiment of the invention.
Figure 4:
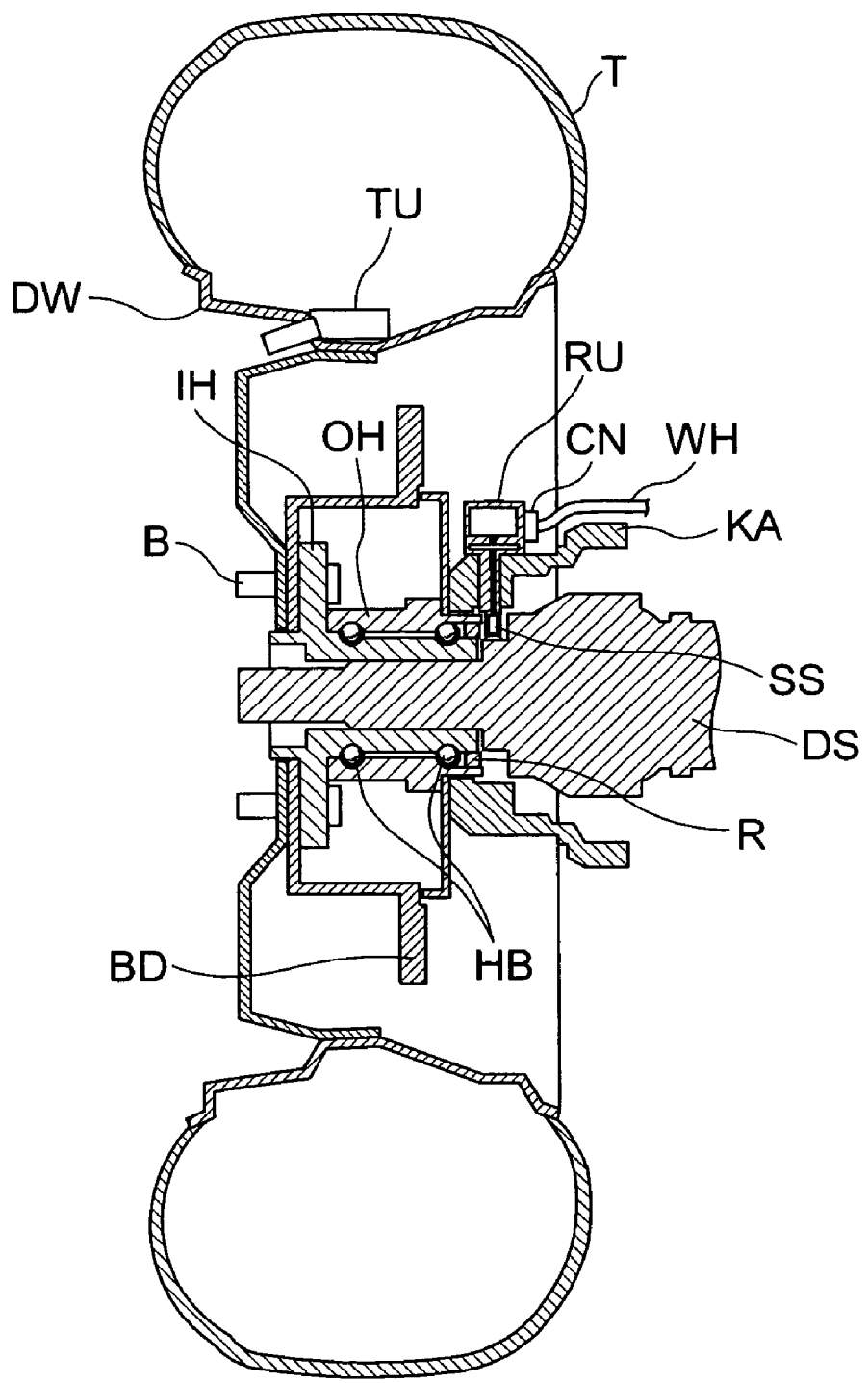
FIG. 4 is a schematic cross-sectional view showing a structure of the tire information transmission device of the first embodiment of the invention.

FIG. 1 is a block diagram showing a schema of a tire information transmission device of a first embodiment of the invention. FIG. 2 is an entire configuration diagram showing a schema of the tire information transmission device of the first embodiment of the invention. FIG. 3 is a schematic perspective view showing a mounted state of the tire information transmission device on a vehicle in the first embodiment of the invention. FIG. 4 is a schematic cross-sectional view showing a structure of the tire information transmission device of the first embodiment of the invention. FIG. 5 is a cross-sectional view showing a mounted state of the tire information transmission device on a driven wheel of the vehicle in the first embodiment of the invention.

In the drawings, the present first embodiment of the tire information communication device is composed of a transmitting unit TU installed at disc wheels DW of a front wheel and a rear wheel of a vehicle and a receiving unit RU installed at a vehicle main body side. The transmitting unit TU is composed of a detecting unit DU that has a function of sensing a pressure and that is added with a function of sensing a temperature, an acceleration, and a power supply voltage thereof as necessary, a modulating circuit MO that modulates a signal in order to transmit an information from the detecting unit DU to the receiving unit RU and a transmission antenna TA. In case the transmitting unit TU is attached to the disc wheel DW shown in FIG. 4, it may be mounted at a side of a tire T or the like according to its specification. It is well-known, however, either of them is mounted on a rotating portion.

The receiving unit RU is composed of a receiving antenna RA for receiving a signal of electromagnetic waves sent from the transmitting unit TU and a demodulating circuit DC demodulating a received signal. An output of the demodulating circuit DC is connected to a vehicle system control unit VU directly or via a wire harness WH after waveform shaping. Moreover, a vehicle wheel speed sensor SS detecting a rotating speed of a wheel has a configuration to output a signal to the vehicle system control unit VCU directly or after waveform shaping.

As shown in FIG. 2, the receiving antenna RA is formed by a wire (lead wire) having a length λ/4 that of a wavelength λ of the electromagnetic waves transmitted to the wire harness WH from the transmitting unit TU or a length of an integral multiple thereof or ⅝λ.

That is, the wire harness WH is composed of the output of the demodulating circuit DC that demodulated the signal sent from the transmitting unit TU, a wire of the output of the vehicle wheel speed sensor SS detecting the rotating speed of the wheel, the receiving antenna RA made of the wire having the length λ/4 that of the wavelength λ of the electromagnetic waves in use or the length of the integral multiple thereof or ⅝λ and a connector CN connected electrically and mechanically to the receiving unit RU. While the connection is made by use of the connector CN in the present embodiment, there is no particular intention to limit to it. There is no problem even if it is connected directly by a welding, a caulking or the like.

The transmission antenna TA of the transmitting unit TU sends an air pressure or a temperature information or the like of the tire T at fixed intervals. At this time, the modulating circuit MO in the transmitting unit TU modulates the information detected by the detecting unit DU for transmission. The information transmitted from the transmission antenna TA uses a frequency such as 315 MHz, 433 MHz or 868 MHz, for example, which is a frequency allocated for a vehicle. The frequency used in the tire information communication device is not limited to the above ones. It may be any frequency band admitted for use in the vehicle.

Moreover, a cycle of a communication performed between the transmitting unit TU and the receiving unit RU is different when the vehicle is stopping and running and the tire is in abnormal state. When the vehicle is stopping, once for several hours may be possible, for example. However, at the time of abnormal state, it is controlled such that it becomes a transmission cycle within one second, for example. How to control is set separately for individual vehicle systems, so the present invention is not limited to the above ways of doing. Moreover, as a communication system, some ways are adoptable such as a way in which the receiving unit RU requires a transmission to the transmitting unit TU or a way in which the transmitting unit TU periodically transmits the signal to the receiving unit RU.

The communication information is received at the receiving antenna RA of the receiving unit RU and then demodulated by the demodulating circuit DC. At this time, it is normally treated as a low frequency signal of about several dozens of KHz and is outputted to the vehicle system control unit VCU.

As shown in FIG. 3, the receiving unit RU is disposed on a knuckle arm that is supported on a not-shown suspension at a vehicle body side so that, when the tire T rotates, it is positioned at an inner diameter side of a rotation locus of the transmitting unit TU or positively at an inner diameter side relative to a diameter of a brake disc BD, i.e. at a side surface of the brake disc BD. Preferably, if it is disposed such that a side connected to the receiving unit RU is in parallel with a rotation axis of the tire T, a polarized plane and a directivity of the antenna is maintained substantially constant even in relation to a rotation of the transmitting unit TU. Consequently, a high receiving sensitivity is stably obtainable.

The disc wheel DW is mounted with the transmitting unit TU that includes the detecting unit DU having a temperature sensor inside the tire T, a pressure sensor for detecting if the tire is rotating or not or an acceleration sensor according to needs. A drive shaft DS as an axle and an inside hub IH are coupled. Moreover, the brake disc BD is fixed so as to rotate integrally with the inside hub IH. The disc wheel DW is engaged with the inside hub IH by bolts B so as to rotate integrally therewith. A plurality of hub bearings HB are disposed between the inside hub IH and an outside hub OH. The outside hub OH is secured integrally with the knuckle arm KA that is coupled with a not-shown suspension arm of a main body of the vehicle. Then, there is provided a structure by the aforementioned hub bearings HB so that a torque of the inside hub IH does not operate on the outside hub OH.

The receiving unit RU is attached to the knuckle arm KA. The receiving unit RU is formed by a resin by making into one body the receiving antenna RA for receiving the air pressure, the temperature information or the like inside the tire T from the transmitting unit TU, the demodulating circuit DC demodulating the received signal and the vehicle wheel speed sensor SS detecting the wheel speed. A sensor of a type using a hall element is mostly used as the vehicle wheel speed sensor SS.

The vehicle wheel speed sensor SS detects a number of rotationa of the disc wheel DW by a rotor R arranged on the inside hub IH detecting a magnetic field that changes when it rotates integrally with the disc wheel DW. The vehicle wheel speed sensor SS of the receiving unit RU may be made into an integral structure by being connected via a connector. If the vehicle wheel speed sensor SS is formed into the integral structure on the receiving unit RU, there are no parts needed for attachment. Consequently, the device can reduce costs and assembling steps by that much. Normally, the receiving unit RU is mounted on each wheel of the vehicle. However, if the aforementioned vehicle wheel speed sensor SS is mounted on the vehicle as a separate body, it may be only on the front wheels or rear wheels.

FIG. 5 illustrates a case where the disc wheel DW to which the transmitting unit TU of the tire information sensing device WIS is attached is not a drive shaft, that is a case where it is a driven wheel. In FIG. 5 of this case, the drive shaft shown in FIG. 4 is eliminated, so that the receiving unit RU is enabled to be arranged near approximately a rotation center of the tire T. With such structure, the receiving antenna RA is installed near the rotation center of the tire T. Then, even if the transmitting unit TU is rotated in accordance with the rotation of the tire T, a distance between the receiving unit RU and it can be maintained constant. Consequently, it is possible to obtain a stable receiving sensitivity. Moreover, if the receiving antenna RA is attached such that is becomes parallel to the rotation axis of the tire T, the polarized plane and the directivity of the antenna is kept constant relative to the rotation of the transmitting unit TU. Therefore, it is possible to obtain a more improved receiving sensitivity.

As described above, it has the transmitting unit TU detecting the state information of the tire T of the vehicle so as to output the detected signal to the outside as the electromagnetic waves. It further has the receiving unit RU receiving at least the state information as the electromagnetic waves from the transmitting unit TU near the end portion of the drive shaft DS of the vehicle, or the information added with the functions of sensing the temperature, the acceleration and the power supply voltage if required. The receiving antenna RA of the receiving unit RU is made of the wire such as a lead wire of a predetermined length that is positioned at the inner diameter side of the rotation locus of the transmitting unit TU when the tire T rotates and that is made integral inside the wire harness WH connected to the receiving unit RU.

Accordingly, the transmitting unit TU detects the state information of the tire TU of the vehicle and outputs the detected signal to the outside as the electromagnetic waves. The receiving unit RU receives the state information of the tire T from the transmitting unit TU as the electromagnetic waves near the end portion of the drive shaft DS of the vehicle. At this time, the receiving antenna RA of the receiving unit RU is always positioned at the inner diameter side of the rotation locus of the transmitting unit TU when the tire T rotates. Consequently, it shortens a reaching distance of the electromagnetic waves and lessens a change thereof, thereby making it easy to keep a stable receiving sensitivity state. That is, the distance is short in sending and receiving the electromagnetic waves and the reception can be performed at a position where an electromagnetic intensity is high. As a result, it is possible to lower a probability of noise entrance. Moreover, it can be used in a condition where a S/N ratio becomes high. In addition, the receiving antenna RA is composed of the wire such as the lead wire of the predetermined length that is made integral inside the wire harness WH connected to the receiving unit RU. Therefore, it becomes easy to make the receiving antenna RA in the length of $\lambda/4$ of the wavelength λ of the electromagnetic waves in use, the length of the integral multiple thereof, or ⅝λ. As a result, the receiving sensitivity can be improved. Furthermore, the wire such as the lead wire of the predetermined length inside the wire harness WH constitutes the receiving antenna RA. Accordingly, the housing of the receiving unit RU can be structured compact. Moreover, a mechanical interference can be prevented in installing surrounding parts.

SECOND TO FOURTH EMBODIMENTS

Figure 6:
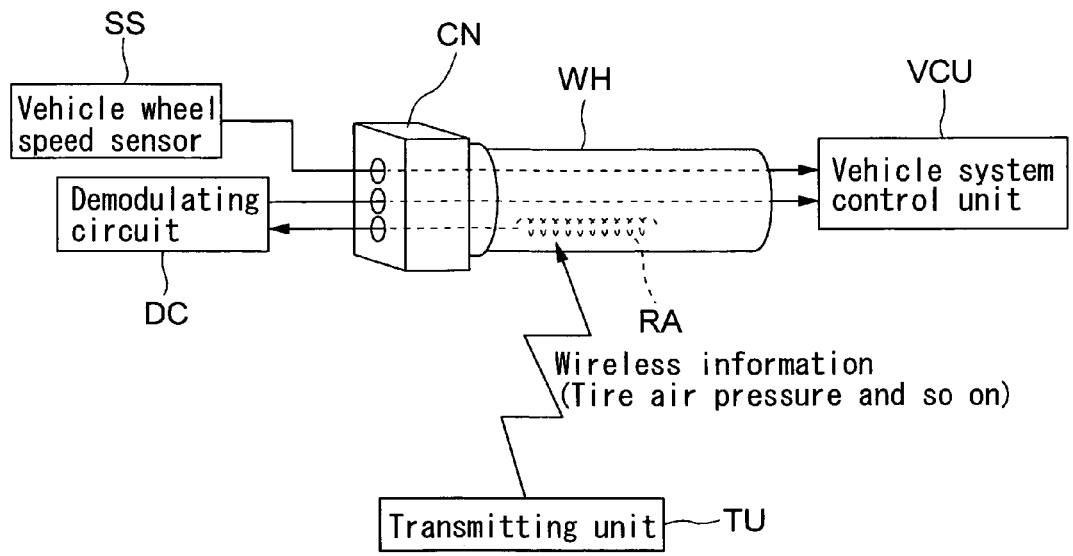
FIG. 6 is an entire configuration diagram showing a schema of a tire information transmission device of a second embodiment of the invention.
Figure 7:
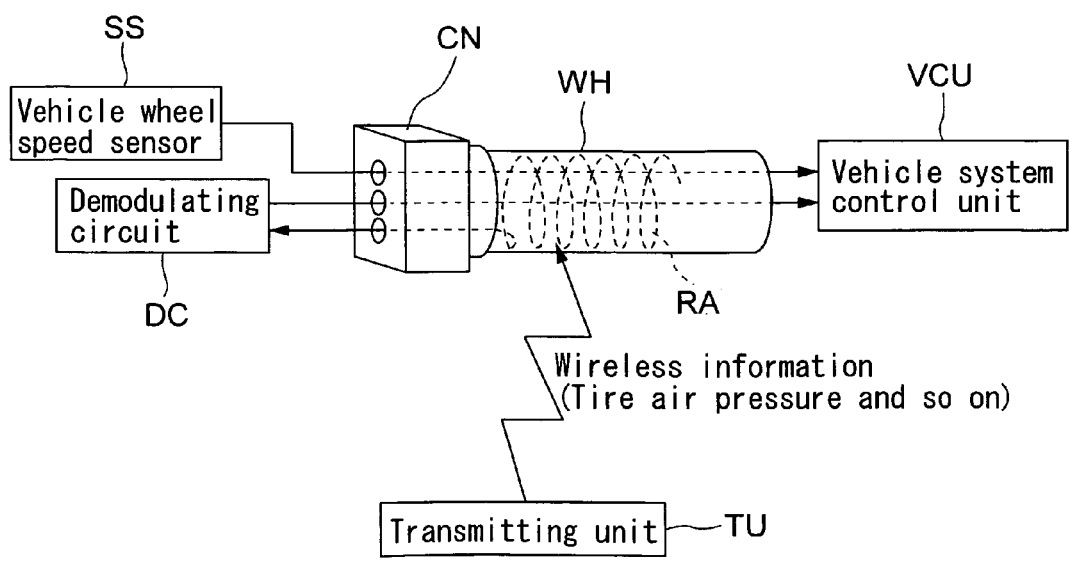
FIG. 7 is an entire configuration diagram showing a schema of a tire information transmission device of a third embodiment of the invention.

In the first embodiment of the tire information communication device described in FIG. 1 to FIG. 5, the receiving antenna RA of the receiving unit RU is made of the wire such as the linear and bendable lead wire of the predetermined length that is made integral inside the wire harness WH connected to the receiving unit RU. In embodying the present invention, FIG. 6 is an entire configuration diagram showing a schema of a tire information transmission device of a second embodiment of the invention and FIG. 7 is an entire configuration diagram showing a schema of a tire information transmission device of a third embodiment of the invention. In the present embodiments, the same characters or the same codes as those of the first embodiment show the same or corresponding component parts as those of the aforementioned first embodiment. Only features different from the aforementioned first embodiment are described hereafter.

In FIG. 6, a receiving antenna RA of a receiving unit RU is made of a wire such as a lead wire of a coiled shape in a predetermined length that is bendable and that is made integral with a wire harness WH connected to a receiving unit RU. Accordingly, it is wound in the coiled shape inside the wire harness WH connected to the receiving unit RU so as to be set in the predetermined length, so that a comparatively long antenna length is obtainable in the receiving antenna RA as desired.

In FIG. 7, a receiving antenna RA of a receiving unit RU is made of a wire such as a lead wire of a predetermined length that is bendable so as to be wound around whole wires of a wire harness WH connected to a receiving unit RU. Accordingly, it is wound in the coiled shape in the wire harness WH connected to the receiving unit RU as to be set in the predetermined length, so that a comparatively long antenna length is obtainable as desired. Moreover, the wire is wound in so as to bind the entire wires of the wire harness WH. Thus, even if the frequency of the electromagnetic waves received at the receiving antenna RA is low, there are no noises induced on the other wires.

In FIG. 7, the receiving antenna RA of the receiving unit RU is made of the wire such as the lead wire of the predetermined length that is bendable so as to be wound around the whole wires of the wire harness WH connected to the receiving unit RU. However, a fourth embodiment may be composed of a wire that is made of a knitted and braided lead wire (not shown) that is knitted into an envelope shape so as to wrap around the entire wires of the wire harness WH. In this case, the knitted and braided lead wire of the envelope shape is set in the predetermined length in the wire harness WH connected to the receiving unit RU. Therefore, a desired antenna length is obtainable. Moreover, the knitted and braided wire covers the wires so as to wrap around the entire wires of the wire harness WH. Thus, even if the frequency of the electromagnetic waves received at the receiving antenna RA made of the knitted and braided wire is low or even if a high frequency is overlapped, there are no noises induced on the lead wire put into the others.

FIFTH AND SIXTH EMBODIMENTS

Figure 8:
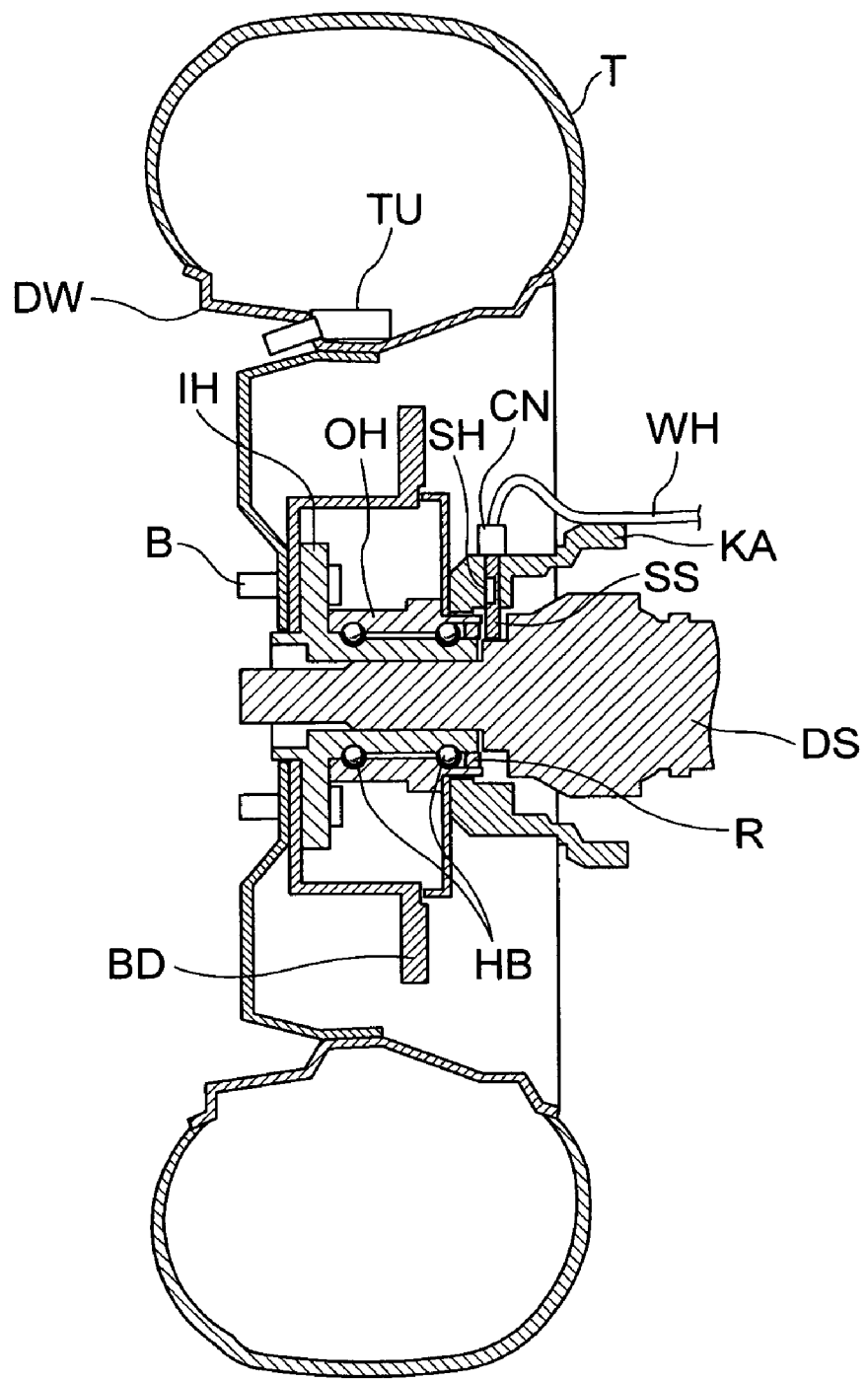
FIG. 8 is a schematic cross-sectional view showing a structure of a tire information transmission device of a fifth embodiment of the invention.
Figure 9:
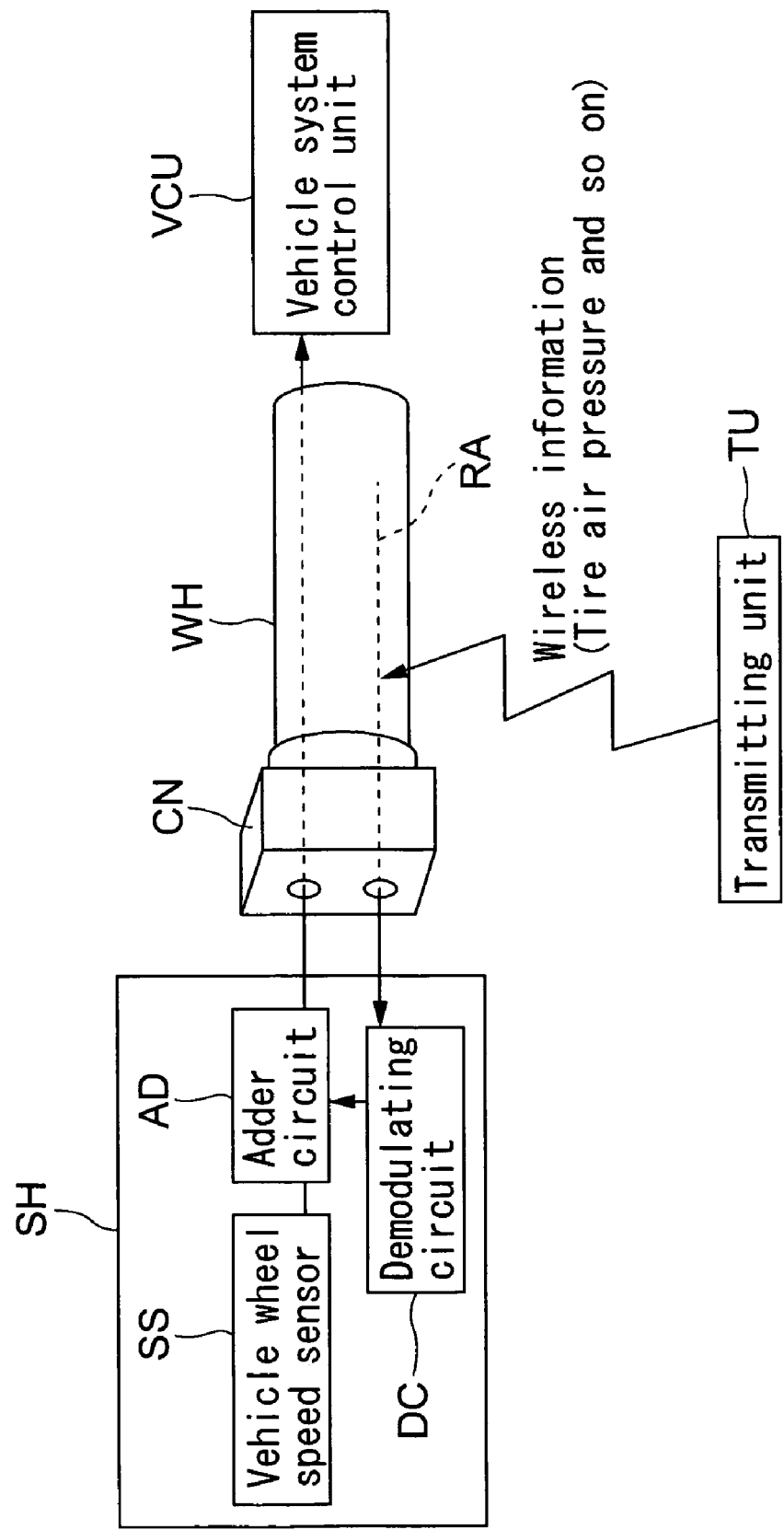
FIG. 9 is an entire configuration diagram showing a schema of the tire information transmission device of the fifth embodiment of the invention.

In the tire information communication device of the first to the fourth embodiments described in FIG. 1 to FIG. 7, the receiving unit RU is provided separately from the vehicle wheel speed sensor SS. In embodying the present invention, the receiving unit RU may be accommodated inside the housing of the vehicle wheel speed sensor SS. FIG. 8 is a schematic cross-sectional view showing a structure of a tire information transmission device of a fifth embodiment of the invention. FIG. 9 is an entire configuration diagram showing a schema of the tire information transmission device of the fifth embodiment of the invention. FIG. 10 is an entire configuration diagram showing a schema of a tire information transmission device of a sixth embodiment of the invention. In the present embodiments, the same characters or the same codes as those of the first to the fourth embodiments show the same or corresponding component parts as those of the aforementioned first to the fourth embodiments. Only features different from the aforementioned first to the fourth embodiments are described hereafter.

In FIG. 8, a demodulating circuit DC of a receiving unit RU is accommodated in a housing SH of a vehicle wheel speed sensor SS. A wire harness WH is connected to the demodulating circuit DC via a connector CN. One of the receiving antennas RA of the first embodiment to the fourth embodiment is disposed on the wire harness WH. In addition, if the demodulating circuit DC of the receiving unit RU accommodated in the housing SH of the vehicle wheel speed sensor SS as described above, it is desirable to lessen signal lines put to an outside. Then, as shown in FIG. 9, a frequency of a carrier wave or a carrier is made into several MHz by a mixer on the information of the tire T of the vehicle received at the receiving unit RU, while an output of the vehicle wheel speed sensor SS is detected. Alternatively, the information is demodulated once and then modulated again by use of a carrier wave of several MHz. Then, such modulated signal is overlapped with the output of the vehicle wheel speed sensor SS by an adder circuit AD and outputted to the vehicle system control unit VCU. With such configuration, the output of the state information of the tire T that has a relatively high frequency can be outputted to the vehicle system control unit VCU, while being overlapped with the output of the vehicle wheel speed sensor SS that has a relatively low frequency via the wire as a signal line of the vehicle wire speed sensor SS inherent in the wire harness.

Particularly, even if a rectangular wave output of the vehicle wheel speed sensor SS having the relatively low frequency and the state information of the tire T having the high frequency are outputted while being overlapped, the vehicle system control unit VCU can take out each of the signals of the vehicle wheel speed sensor SS and the tire T separately simply through a filter. Consequently, it becomes low-cost.

Moreover, as shown in FIG. 10, an output of a vehicle wheel speed sensor Ss is made into a carrier wave. Then, after a state information of the tire T of the vehicle is detected, an output of the state information of the tire T of the vehicle outputted from the demodulating circuit DC of the receiving unit RU can be modulated by either of PAM or PWM through a modulating circuit MC. A quantity of the state information of the tire T of the vehicle is quantized before being inputted in the modulating circuit MC. As described above, modulating into the signal adequate for digital processing reduces costs of devices at a side of the vehicle system control unit VCU, too.

As described above, the fifth embodiment of the tire information communication device has the transmitting unit TU detecting the state information of the tire T of the vehicle so as to output the detected signal to the outside as the electromagnetic waves. It further has the receiving unit RU receiving the state information of the tire T as the electromagnetic waves from the transmitting unit TU near the end portion of the drive shaft DS. The receiving unit RU is accommodated inside the housing of the vehicle wheel speed sensor SS. The receiving antenna RA is made of the wire of the predetermined length that is positioned at the inner diameter side of the rotation locus of the transmitting unit TU when the tire T rotates and that is made integral inside the wire harness WH connected to the receiving unit RU. The output of the vehicle wheel speed sensor SS is overlapped with the output of the state information of the tire T, thereby outputting both the outputs through a common line.

Accordingly, the transmitting unit TU detects the state information of the tire T of the vehicle and outputs the detected signal to the outside as the electromagnetic waves. The receiving unit RU accommodated in the housing of the vehicle wheel speed sensor SS receives the state information of the tire T from the transmitting unit TU as the electromagnetic waves near the end portion of the drive shaft DS. At this time, the receiving antenna RA of the receiving unit RU is positioned at the inner diameter side of the rotation locus of the transmitting unit TU when the tire T rotates. Consequently, it lessens a change of a reaching distance of the electromagnetic waves, thereby making it easy to keep a stable receiving sensitivity state. That is, the distance is short in sending and receiving the electromagnetic waves and the reception can be performed at a position where an electromagnetic intensity is high. As a result, it is possible to lower a probability of noise entrance. Moreover, it can be used in a condition where a S/N ratio becomes high. In addition, the receiving antenna RA is composed of the wire of the predetermined length that is made integral inside the wire harness WH connected to the receiving unit RU. Therefore, it becomes easy to make the receiving antenna RA of the receiving unit RU in the length of $\lambda/4$ of the wavelength $\lambda$ of the electromagnetic waves in use, the length of the integral multiple thereof, or $5/8\lambda$. Furthermore, the wire of the predetermined length inside the wire harness WH constitutes the receiving antenna RA. Accordingly, the housing of the vehicle wheel speed sensor SS accommodating the receiving unit RU can be structured without growing in size. Moreover, a mechanical interference can be prevented in installing surrounding parts. In addition, the output of the state information of the tire T is overlapped with the output of the vehicle wheel speed sensor SS and both the outputs are outputted through the common line. Consequently, a conventional wiring can be used in the vehicle wheel speed sensor SS, thereby reducing the costs.

In addition, the sixth embodiment of the tire information communication device has the transmitting unit TU detecting the state information of the tire T of the vehicle so as to output the detected signal to the outside as the electromagnetic waves. It further has the receiving unit RU receiving the state information of the tire T as the electromagnetic waves from the transmitting unit TU near the end portion of the drive shaft DS. The receiving unit RU is accommodated inside the housing of the vehicle wheel speed sensor SS. The receiving antenna RA is made of the wire of the predetermined length that is positioned at the inner diameter side of the rotation locus of the transmitting unit TU when the tire T rotates and that is made integral inside the wire harness WH connected to the receiving unit RU. The output of the vehicle wheel speed sensor SS and the output of the state information of the tire T are modulated, thereby outputting both the outputs through a common line.

Accordingly, the transmitting unit TU detects the state information of the tire T of the vehicle and outputs the detected signal to the outside as the electromagnetic waves. The receiving unit RU accommodated in the housing of the vehicle wheel speed sensor SS receives the state information of the tire T from the transmitting unit TU as the electromagnetic waves near the end portion of the drive shaft DS. At this time, the receiving antenna RA of the receiving unit RU is positioned at the inner diameter side of the rotation locus of the transmitting unit TU when the tire T rotates. Consequently, it lessens a change of a reaching distance of the electromagnetic waves, thereby making it easy to keep a stable receiving sensitivity state. Moreover, the receiving antenna RA is composed of the wire of the predetermined length that is made integral inside the wire harness WH connected to the receiving unit RU. Therefore, it becomes easy to make the receiving antenna RA of the receiving unit RU in the length of $\lambda/4$ of the wavelength $\lambda$ of the electromagnetic waves in use, the length of the integral multiple thereof, or $5/8\lambda$. Furthermore, the wire of the predetermined length inside the wire harness WH constitutes the receiving antenna RA. Accordingly, the housing of the vehicle wheel speed sensor SS accommodating the receiving unit RU can be structured without growing in size. Moreover, a mechanical interference can be prevented in installing surrounding parts. In addition, the output of the state information of the tire T is carried over the output of the vehicle wheel speed sensor SS while being modulated so that both the outputs are outputted through the common line. Consequently, a conventional wiring can be used in the vehicle wheel speed sensor SS, thereby reducing the costs.

The invention claimed is:

1. A tire information communication device characterized by comprising:
   a transmitting unit detecting a state information of a tire of a vehicle and outputting its detection signal to an outside as electromagnetic waves; and
   a receiving unit receiving the state information of the tire from the transmitting unit as the electromagnetic waves near an end portion of an axle of the vehicle while being housed in or disposed together with a housing of a vehicle wheel speed sensor;
   wherein an antenna of the receiving unit is composed of a wire of a predetermined length positioned inside a cylindrical space having a rotation locus of the transmitting unit as an outer diameter thereof and having the axle as a center axis when the tire rotates, the wire being made integral with a wire harness that is connected to the receiving unit, an output of the state information of the tire being overlapped with an output of the vehicle wheel speed sensor so that both the outputs are outputted by a common line.

2. A tire information communication device characterized by comprising:
   a transmitting unit detecting a state information of a tire of a vehicle and outputting its detection signal to an outside as electromagnetic waves; and
   a receiving unit receiving the state information of the tire from the transmitting unit as the electromagnetic waves near an end portion of an axle of the vehicle while being housed in or disposed together with a housing of a vehicle wheel speed sensor;
   wherein an antenna of the receiving unit is composed of a wire of a predetermined length positioned inside a cylindrical space having a rotation locus of the transmitting unit as an outer diameter thereof and having the axle as a center axis when the tire rotates, the wire being made integral with a wire harness that is connected to the receiving unit, an output of the vehicle wheel speed sensor and an output of the state information of the tire being modulated so that both the outputs are outputted by a common line.

* * * * *